(12) United States Patent
Peterson

(10) Patent No.: US 6,191,957 B1
(45) Date of Patent: Feb. 20, 2001

(54) EXTENDED RANGE BOOST CONVERTER CIRCUIT

(75) Inventor: William Anders Peterson, Vestal, NY (US)

(73) Assignee: Bae Systems Controls, Inc., Johnson City, NY (US)

(*) Notice: Under 35 U.S.C. 154(b), the term of this patent shall be extended for 0 days.

(21) Appl. No.: 09/494,641

(22) Filed: Jan. 31, 2000

(51) Int. Cl.[7] .................................................. H02M 3/335
(52) U.S. Cl. .............................. 363/17; 363/98; 363/132
(58) Field of Search ................................. 363/17, 37, 40, 363/57, 60, 95, 98, 131, 132

(56) References Cited

U.S. PATENT DOCUMENTS

| | | | |
|---|---|---|---|
| 4,504,895 | * 3/1985 | Steigerwald | 363/17 |
| 4,597,026 | * 6/1986 | Santurtun et al. | 361/101 |
| 4,608,499 | * 8/1986 | Rathmann | 307/66 |
| 4,967,333 | * 10/1990 | Callier et al. | 363/17 |
| 5,081,570 | * 1/1992 | Chibani et al. | 363/17 |
| 5,157,592 | * 10/1992 | Walters | 363/17 |
| 5,367,448 | * 11/1994 | Carroll | 363/89 |
| 5,400,235 | * 3/1995 | Carroll | 363/17 |
| 5,528,125 | 6/1996 | Marshall et al. . | |
| 5,576,940 | * 11/1996 | Steigerwald et al. | 363/17 |
| 5,654,881 | 8/1997 | Albrecht et al. . | |
| 5,719,754 | * 2/1998 | Fraidlin et al. | 363/17 |
| 5,726,845 | 3/1998 | Ho . | |
| 6,038,142 | * 3/2000 | Fraidlin et al. | 363/17 |

OTHER PUBLICATIONS

Weinberg et al., A High–Power High–Voltage DC–DC Converter for Space Applications; IEEE Transactions on Power Electronics, vol. PE–1, No. 3, Jul. 1986, pp. 148–160.

Redi et al., Push–Pull Current–Fed Multiple–Output Regulated Wide–Input–Range DC/DC Power Converter with Only One Inductor and With 0 to 100% Switch Duty Ratio: Operation at Duty Ratio Below 50%; PESC'81 Record; IEEE Power Electronics Specialists Conference–1981; Jun. 29–Jul. 3, 1981; pp. 204–212.

\* cited by examiner

Primary Examiner—Adolf Deneke Berhane
(74) Attorney, Agent, or Firm—Geoffrey H. Krauss

(57) ABSTRACT

A power converter comprises a power transformer having a primary winding and a secondary winding flux coupled to the primary winding, input terminals for receiving an input voltage, and output terminals for providing an output voltage. A power switching arrangement comprising two pairs of switching devices arranged in a bridge configuration has a corresponding duty cycle which is selectable so as to cause the power converter to manifest different input output transfer characteristics corresponding to buck and boost modes of operation. An inductor having a single winding is coupled between the input terminals and the primary winding through the switching devices. Secondary winding rectification and filtering provides the power supply output. A reset circuit coupled to the output terminal of the single winding inductor and connected to the input terminals provides a current path for discharging the inductor during a predetermined time interval corresponding to that portion of the duty cycle when all of the switching devices are off to enable operation of the power supply in a buck mode of operation.

20 Claims, 6 Drawing Sheets

$$V_{out} = \frac{N V_{in}}{(1-D)}$$

$$V_{out} = \frac{N V_{in}}{(1-D)}$$

EXTENDED RANGE BOOST CONVERTER CIRCUIT

FIELD OF THE INVENTION

The present invention relates to electrical power converters and, more particularly, to an electric power converter that can operate with an input voltage varying over a wide range.

BACKGROUND OF THE INVENTION

Converter circuits, such as DC-to-DC converters, are often used in electronic systems of the type, such as avionics systems and the like, where an electronic-regulated power supply is required to operate even though energized with an input voltage which varies over a very wide input voltage range. One such regulated power supply is commonly known as a boost converter. In general, a boost converter circuit operates to boost the input voltage to generate a higher output voltage. A conventional boost converter circuit 10 is depicted in FIG. 1 (Prior Art), wherein a DC input voltage Vin is applied at an input terminal 10a with reference to a common terminal 10c. An output voltage Vout is developed at an output terminal 10b with reference to common terminal 10c (e.g. ground potential), and thus appears across a capacitor 18. An inductor 12 has a first terminal 12a coupled to input terminal 10a and a second terminal 12b coupled to both the anode of a rectifier diode 14 and a drain element of a switching device 16. As one skilled in the art understands, switch 16 (which is coupled between the output side of the boost inductor 12 and ground terminal 10c) is switched on and off responsive to the switching device gate electrode drive signal, which has a duty cycle (i.e. ratio of 'on' or 'off' portion to an entire on-off cycle) D, which is never greater than 1. In each switching cycle or duty cycle D, energy is stored in the inductor 12 when the switch is closed or conducting (ON period) and released to output terminal 10b via diode rectifier 14 when the switch is opened or non-conductive (OFF period). Thus, energy is stored in inductor 12 such that energy output from the inductor upon discharge is added to the input voltage Vin to produce an output voltage Vout that is greater than the input.

FIGS. 2A and 3A illustrate conventional enhancements to the basic boost configuration shown in FIG. 1. FIG. 2A shows a converter 10' with a conventional transformer 20 forming a push-pull transformer-coupled boost converter operated in a boost mode (greater than 50% duty cycle). The duty cycles DQ1 and DQ2 associated with the switching devices 16-1 and 16-2 for this circuit are shown in FIG. 2B. FIG. 3A shows a conventional full-bridge transformer-coupled boost converter 10" operated in boost mode (greater than 50% duty cycle) with duty cycles DQ1 and DQ2 associated with the respective switching devices Q1, Q3 and Q2, Q4 driven by the switching waveforms as shown in FIG. 3B. Each of the converters shown produces an output voltage according to the equation Vo=N*Vin/(1-D) where D is the duty cycle of the circuit and N is the secondary winding-to-primary winding turns ratio of the transformer 20 (N=1 if no transformer, as in converter 10 of FIG. 1).

From the foregoing, one can ascertain that, in any of the circuits depicted in these Figures, the output voltage has a range between Vin and an extremely large value. That is, the output voltage cannot be less than the product of the input voltage and the turns ratio. Since the boost circuit only stores energy in excess of the input voltage, such a circuit is inherently higher efficiency than a circuit that must store the entire output energy, such as a conventional flyback or buck-boost converter system. However, the inability to control the output voltage to a value less than the input voltage can produce significant problems, even when normal operation requires an output voltage greater than the voltage at the input. For instance, at startup, the output voltage is zero while the input voltage, when applied, is usually non-zero. This can lead to a very large current applied to raise the output voltage from zero to the input voltage. In addition, an abnormal condition such as a fault or short circuit at the output may also produce a condition where the output voltage may be less than the input voltage. Under both of these conditions, a boost converter is uncontrolled and the currents produced are not controllable. To permit operation under these conditions, it is customary to add a second switch in series with the boost inductor, and a flyback diode, so as to operate the boost converter as a buck-mode converter. This, however, results in energy loss associated with the additional switch, even when that switch is not in use. In addition, in applications where a rectified alternating-current (AC) waveform, such as a rectified sine wave, is used as the input source, it may be desirable to operate at a voltage that is less than the peak voltage of the input. Conventional transformer-isolated boost converter circuits, such as those depicted in Prior Art FIGS. 2A and 3A, include additional switches that operate to open connections between the input and the output terminals in order to steer the transformer flux as well as control large currents caused by the above-described conditions. Opening of these switches, however, has the undesirable effect of interrupting the current flowing in the boost inductor. Since the energy stored in the boost inductor no longer has a path through which to flow, it will discharge through whatever element it can, thereby destroying the device. Thus, for conventional boost converters, operation in a buck mode (where the switches are off for a given time interval) is not permissible. Adding an additional winding to the boost inductor as disclosed in commonly assigned U.S. Pat. No. 5,654,881, entitled "Extended Range DC—DC Power Converter Circuit" issued Aug. 5, 1997 to Albrecht et al, the subject matter of which is herein incorporated by reference, allows the flux in the inductor to be continuous and produce a buck operating range where the output can be less than the input. However, use of additional windings and associated circuitry to provide an extended range converter proves to be quite costly in most applications. Furthermore, the voltage on the switches when the inductor is discharged may be less than optimal. Still further, it is known that boost converters suffer from parasitic losses such as loss due to leakage inductance, resulting in undesirable energy loss and circuit inefficiency. Accordingly, a power converter which overcomes these problems and which obviates the need for additional windings to operate over an extended range of voltages, is highly desired.

SUMMARY OF THE INVENTION

In accordance with the invention, a power converter comprises: a power transformer having a primary winding and a secondary winding with a secondary winding flux coupled to the primary winding; input terminals for receiving an input voltage; and output terminals for providing an output voltage. A power switching arrangement comprising two pairs of switching devices arranged in a bridge configuration has a corresponding duty cycle which is selectable so as to cause the power converter to manifest different input-output transfer characteristics corresponding to buck and boost modes of operation. An inductor having a single winding is coupled between the input terminal and the primary winding through the switching devices. Secondary winding rectification and filtering provides the power supply output. A reset operating circuit coupled to the output terminal of the single winding inductor and connected to the input terminals provides a current path for discharging the inductor during a predetermined time interval corresponding to that portion of the duty cycle when all of the switching devices are off, to enable operation of the power supply in a buck mode of operation.

A buck-boost converter can comprise a power transformer having a primary winding and a secondary winding with a secondary winding flux coupled to the primary winding, input terminals for receiving an input voltage, output terminals for providing an output voltage, a single winding inductor coupled between the input and the primary winding, a switching arrangement comprising a plurality of switches to be turned on and off according to a duty cycle for controllably causing a flow of current through the primary winding, with a plurality of unidirectional conduction devices coupled to the transformer secondary winding for rectifying flux coupled energy to provide an output voltage Vo to the output terminals, and a reset operating circuit coupled to an output terminal of the inductor and operable in a first mode for providing a current path for discharging the inductor during a predetermined time interval associated with a portion of the duty cycle of the switching arrangement when the plurality of switches are each non-conducting ("off") to enable the boost converter to operate in a first mode where the voltage Vo is lower than the input voltage, and operable in a second mode for providing a path for discharging energy associated with leakage inductance reflected to the output terminal of said single winding inductor when the boost converter is operated in a second mode wherein the plurality of switches are each conducting ("on") during a same portion of the duty cycle.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily to scale.

DETAILED DESCRIPTION OF THE INVENTION

Figure 4:
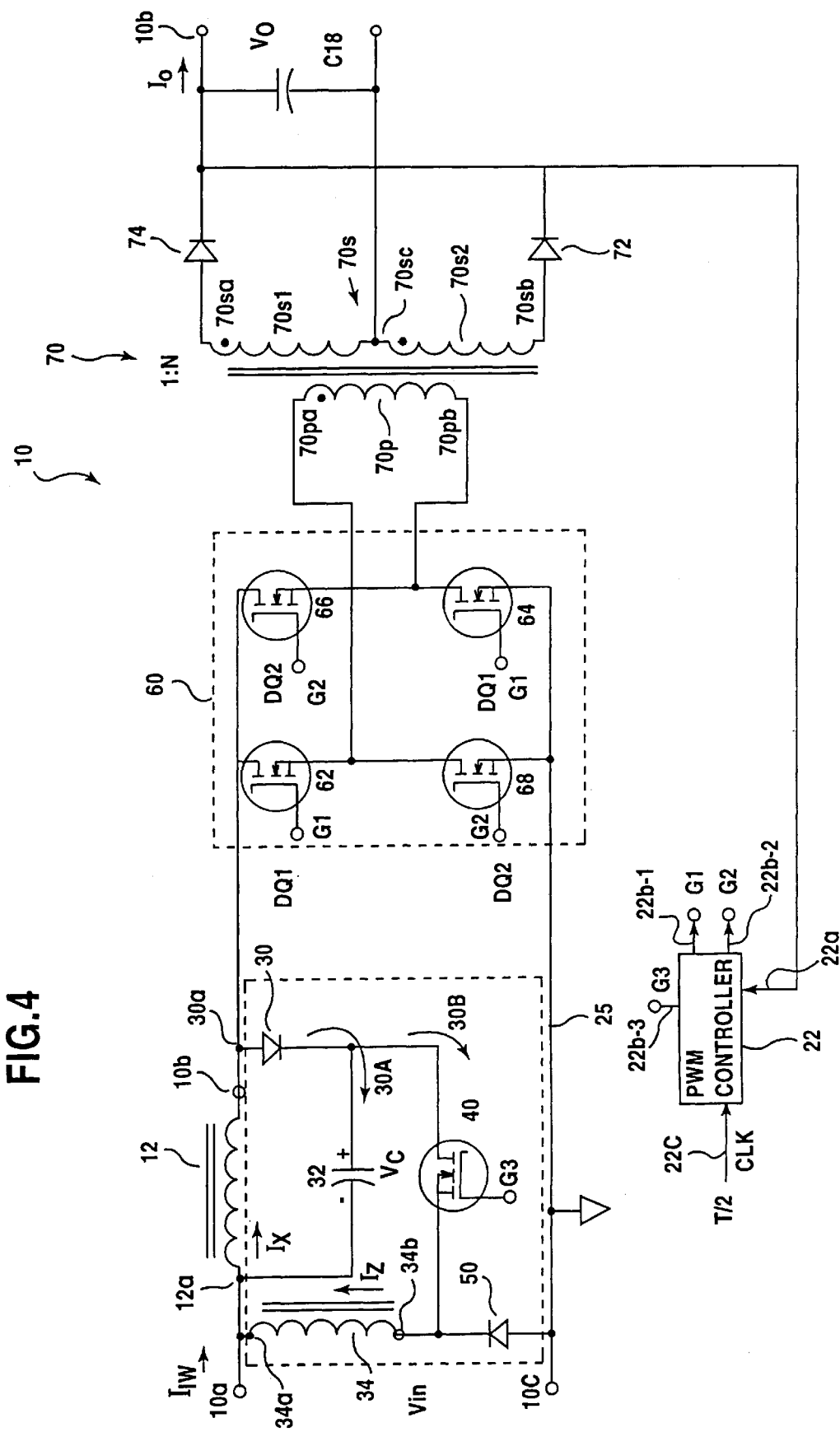
FIG. 4 is a schematic diagram of the circuit of one preferred embodiment of a power converter operable in buck and boost modes, according to the present invention.

Referring now to FIG. 4, there is shown a circuit schematic of a boost power converter 40 according to my present invention, which is operable in both boost and buck modes according to an aspect of the present invention. A DC input voltage Vin is applied between input terminal 40a and a common terminal 40c; a DC output voltage Vo at an output current Io is provided at an output terminal 40b, with respect to an output common terminal 40d. The output voltage Vo appears across a filter capacitance 48.

Figure 1:
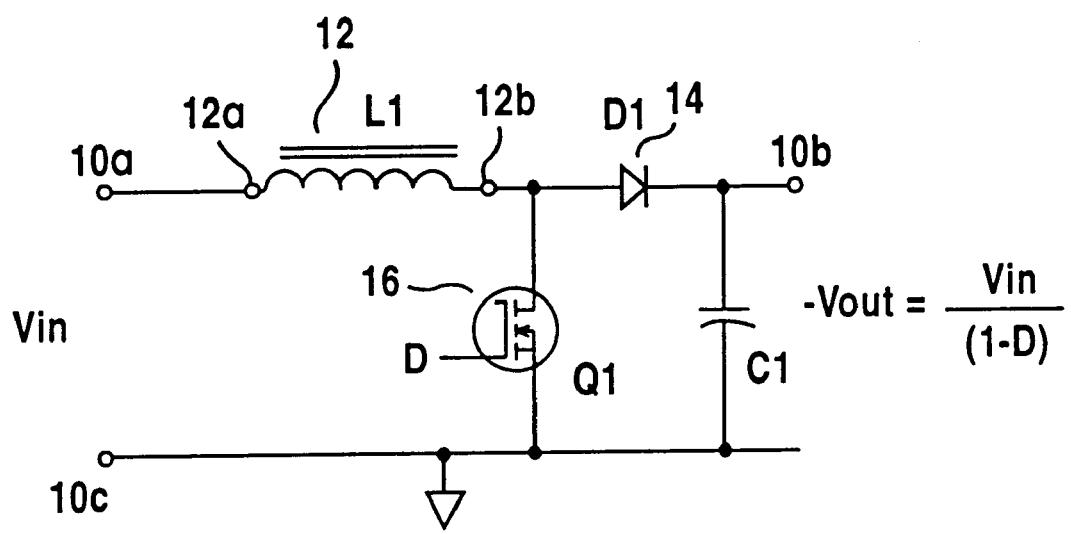
FIG. 1 is a prior art drawing of a basic boost converter circuit.
Figure 2A:
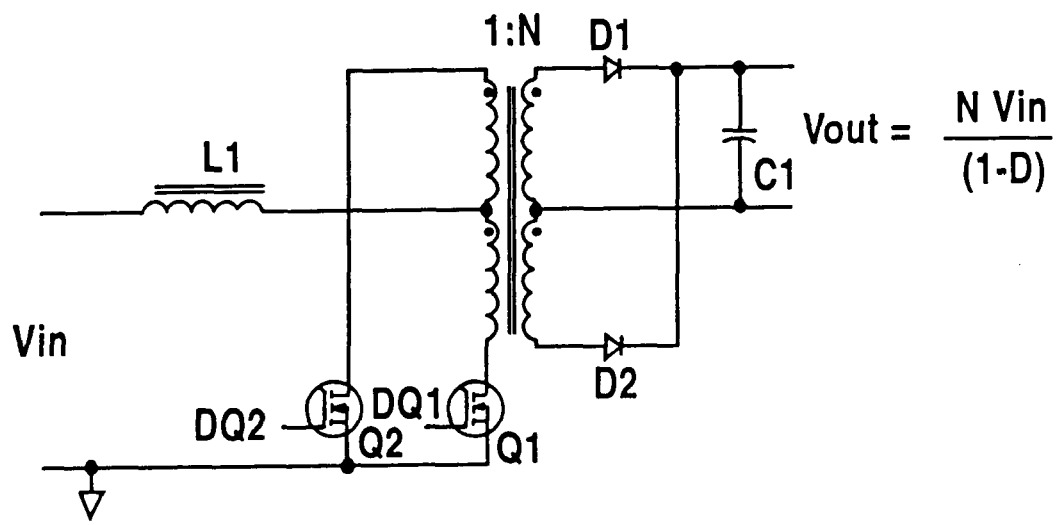
FIGS. 2A and 2B respectively show a schematic diagram of a prior art converter of the push-pull transformer-coupled boost type, and its associated duty-cycle timing diagram.
Figure 2B:
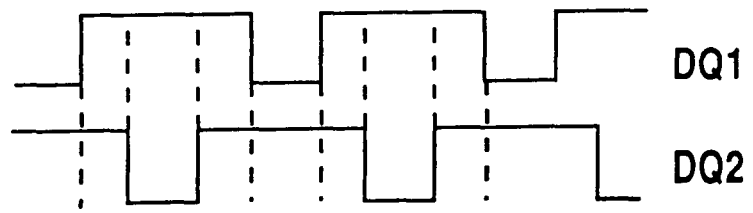
Figure 3A:
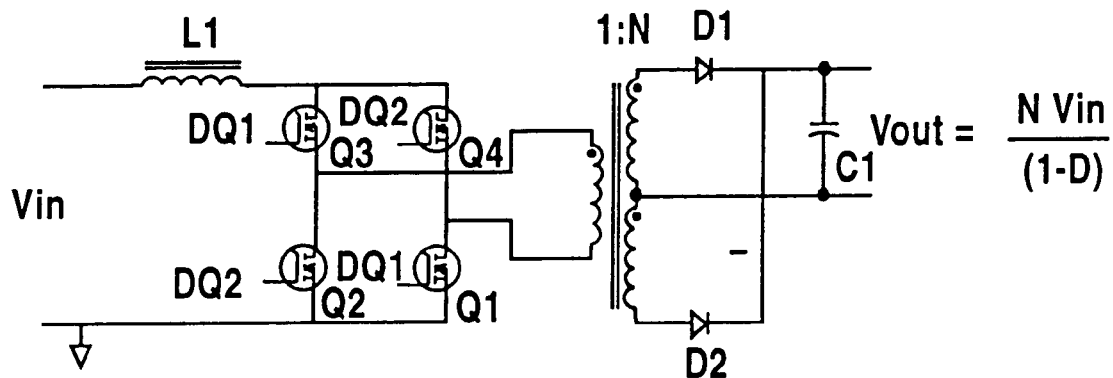
FIGS. 3A and 3B respectively show a schematic diagram of a prior art converter of the full-bridge transformer-coupled boost type, and its associated duty-cycle timing diagram.
Figure 3B:
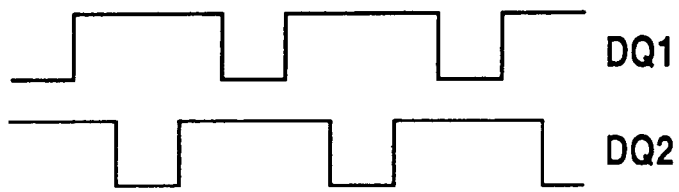
Figure 5:
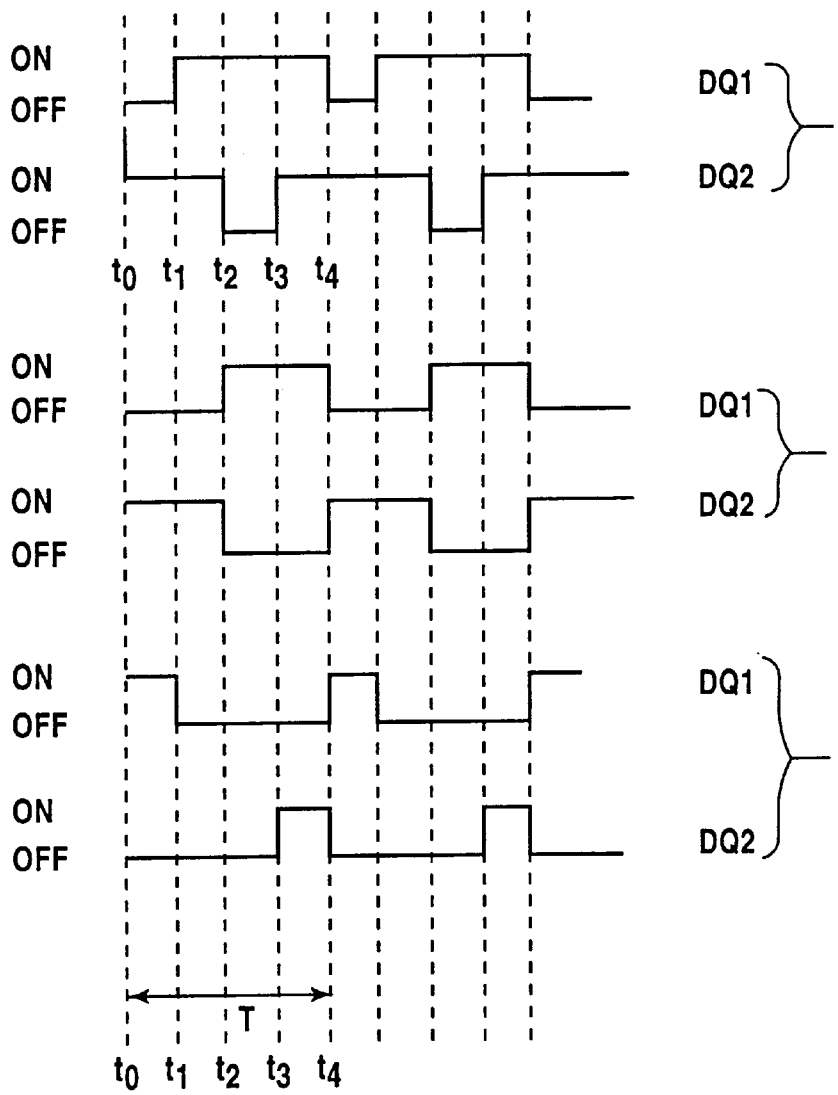
FIGS. 5A–5C illustrate various timing diagrams associated with operation of the power converter of FIG. 4 in boost and buck modes, according to the present invention.

A boost inductor 42 is a single-winding inductive element having a first terminal 42a coupled to input terminal 40a and a second terminal 42b connected both to a switching arrangement 60 and to an anode terminal 44a of a diode 44 which is indicative of a unidirectional current element. Switching arrangement 60 comprises first, second, third and fourth current conductive switching elements 62, 64, 66 and 68, respectively, connected in a conventional bridge configuration. Each of the conductive switching elements is preferably an active switching device such as a power MOSFET and responsive to control signals G1 and G2 at gate terminals thereof. In the preferred embodiment, conductive switching elements 62 and 64 are responsive to control signal G1 at a first (e.g. "high") level to turn "ON" or conduct, and at a second (e.g. "low") level to turn "OFF" or non-conduct, with a duty cycle DQ1 as shown in FIG. 5A. In similar fashion, conductive switching elements 66 and 68 are responsive to control signal G2 so as to turn ON and OFF with a duty cycle DQ2 as shown in FIG. 5A. A pulse-width modulator (PWM) and control means 52 has an input 52a monitoring the magnitude of the output voltage $V_o$ and another input 52c receiving a periodic clock CLK signal. The clock signal establishes the operating frequency of the Boost/Buck converter; an operating frequency in excess of 1 KHz is generally desirable. Controller means 52 has respective first and second outputs 52b-1 and 52b-2 at which the first and second switching device gating, or control, signals G1 and G2 respectively are provided to turn respective device pairs 62, 64 and 66, 68 into the conductive, or ON, condition or into the non-conductive, or OFF, condition. It should be understood that each illustrated device may be a single power-switching device, of semiconductive or other form, or may be plural devices (as necessary to properly switch the required current and/or voltage) controlled in unitary fashion. It should be further understood that the a push-pull topology is also contemplated wherein the pairs of switching devices 62, 64 and 66, 68 may be replaced with two single switching devices and corresponding transformer coupling analogous to that illustrated in FIG. 2A. Controller means 52 further includes third output 52b-3 at which gating control signal G3 is provided to another switching device 46 to enable the device to turn ON or conduct, or to turn off (i.e. disable the device) so that the switch is in a non-conductive state.

In operation, means 52 input 52a monitors the voltage at output 40b and, by any of various well-known means, compares the actual output voltage $V_o$ to a selected output value; means 52 then controls the converter duty cycle, responsive to this determination, to regulate and maintain $V_o$ at the selected value. Means 52 thus determines, at start-up, if the output voltage is greater than, or less than the desired value; this can also be thought of as determining if the input voltage $V_{IN}$ is greater, or less, than $N*V_o$. In the case where the output voltage $V_o$ is less than the input voltage, means 52 adjusts the outputs 52b to control operation of converter 40 in the Buck mode; the converter is operated in the Boost mode when the input voltage $V_o$ is less than the selected output voltage value. For Buck mode operation, if the duty-cycle is less than 50% (i.e., the ratio of switch ON conduction time to the total of switch ON and switch OFF, or non-conduction times in one ON/OFF cycle), then the Buck mode is being used. Buck mode utilizes operating cycle segments (of duration T) during which both switch pairs are non-conductive of OFF (see the DQ1, DQ2 waveforms in FIG. 5B). Also, in Buck mode, a switch pair is conductive, or ON, during a time segment different from the time segment during which the other switch pair is ON.

Diode 50 forms part of reset operating circuit 54 which includes a capacitor 62, another inductor 64, switching element 46 and diode 50. Diode 44 has its anode electrode connected to terminal 12b of the boost inductor and its cathode terminal connected to a controlled current circuit such as a drain-source circuit of switching device 46, and to a first terminal of capacitor 62. Capacitor 62 has a second terminal connected to first boost inductor terminal 12a and to a first terminal 64a of second inductor 34. Second inductor second terminal 64b is connected to the cathode electrode of diode 50 and to switching device 46. The anode electrode of diode 50 is coupled to common reference potential 40c.

A transformer 70 has a primary winding 70p coupled to switching arrangement 60 and a secondary winding 70s coupled to output terminal 40b through unidirectionally-conducting elements 72 and 74, such as semiconductor diodes. In particular, the primary winding has a first end 70pa connected to the controlled currents of first and fourth switching devices 62 and 68, and a second end 70pb connected to the controlled currents of second and third switching devices 64 and 66. Secondary winding 70s includes a first portion 70s1 and a second portion 70s2. Each secondary winding portion has first end 70sa and 70sb connected to an anode electrode of an associated one of the like-poled diodes 72 and 74 whose cathodes are connected in common to capacitor 18 and output terminal 10b. The second ends are connected to secondary winding center tap 70sc. The transformer secondary windings have essentially equal turns coupled to a core so that a first secondary voltage Vs1 of a first polarity appears at a first secondary winding end, while a second secondary voltage Vs2 appears at the second secondary winding end. As shown in FIG. 4, the relationship between primary and secondary windings is 1:N with the windings phased as indicated by the illustrated phasing dots.

In describing normal boost mode operation of the converter 40, reference is made to the waveforms illustrated in FIGS. 5A, 5B and 5C. At time t0, switching devices 62 and 64 are off and 66 and 68 are on. Therefore, current Ix passes from the input through boost inductor 42. Current conductive devices 66 and 68 enable the current to pass through the primary winding of transformer 70 and back to the input terminals. During this interval, the inductor is discharging. At time t1, switching devices 62 and 64 are turned on so that all four switching transistors 62, 64, 66, 68 are on. This time interval is considered the "ON" time for boost duty cycle calculations. When all four transistors are ON, a short circuit current exists across the primary winding of transformer 70. Diodes 72 and 74 operate to block the output voltage Vo so that it is not applied back to the primary winding of transformer 70, and the voltage across the switching arrangement 60 is pulled down to zero. Thus, the voltage at terminal 42b of the boost inductor is clamped to zero volts when all four switching devices are ON. The entire input voltage is thus applied across boost inductor 42, causing the current to ramp up such that energy is stored in the inductor. At time t2, switching devices 66 and 68 are turned off while 62 and 64 remain on. The voltage is then applied across the primary winding 70p in the opposite direction and the energy stored in the inductor 42 now discharges to the output terminal. For normal boost mode operation, the switching devices 62, 64, 66, 68 in the bridge circuit arrangement 60 operate in an overlap condition as illustrated in FIG. 5A. The ratio of the time that all four of the switches are ON (corresponding to when energy is being stored in inductor 12) to the time that two of the four switches are OFF (corresponding to when energy is being discharged from the inductor) is the effective duty cycle D of the circuit. The time when only the diagonal switches (62, 64 or 66, 68) of bridge circuit arrangement 60 are ON (or when only one switch of a push-pull switch arrangement) the voltage at terminal 42b is given as the output voltage Vo divided by the turns ratio N of the transformer. As the boost duty cycle approaches zero boost (corresponding to DQ1 and DQ2 each at 50% duty cycle and 180 degrees out of phase) the output voltage Vo approaches N times the input voltage Vin and the voltage across inductor 42 approaches zero. FIG. 5B illustrate the timing relationships associated with the switching arrangement for DQ1 and DQ2 under these conditions.

When the switches are controlled in a manner so that the boost duty cycle goes below zero boost (corresponding to less than 50% switching ON time), then there exists a time period where all of the switches are OFF (i.e. periods t2–t1, t4–t3). Under these conditions, depicted in FIG. 5C, the inductor current Ix is maintained by diode 44 and capacitor 62 by providing an electrical communication path 44A for the inductor current to flow. That is, the inductor current Ix flows through diode 44 into capacitor 62 to terminal 42a of boost inductor 42 and circulates through the boost inductor. The input current from the source then goes to zero. Because all four switches are OFF during the aforementioned time periods, the current in the switching arrangement 60 also falls to zero. However, the inductor current (which cannot drop to zero) flows through diode 44 and capacitor 62. In this manner energy is transferred from inductor 42 to capacitor 62 so as to develop a charge (i.e. voltage Vc) across capacitor 62. The voltage Vc across capacitor 62 is thus the discharge voltage of inductor 42. Controllable switch 46 is then turned ON via controller means 52 through control signal G3 to cause capacitor 62 to discharge through second inductor 64 via electrical communication path 44b causing energy to be stored in second inductor 64. When switching device 46 is then turned off, the current $I_L$ in second inductor 64 will continue to flow and cause the voltage across second inductor 64 to reverse polarity. This causes diode 50 to become forward biased, causing the current from the inductor to flow back into the input and thereby reducing the average current drawn from the source. In the preferred embodiment, switching device 46 is switched in synchronism with the OFF condition of DQ1 and DQ2. In the general case, however, it is to be understood that the switching of device 46 can occur at a fixed duty cycle K proportional to the time that all four switching devices 62, 64, 66, and 68 are OFF. Therefore, by connecting reset operating circuit 54 to the output of the single winding boost inductor 42 as described, a path is provided for the energy stored in boost inductor 42 to flow when the switches in power switch arrangement 60 are off and current in the output is interrupted. This allows the boost converter having a single winding boost inductor to function over a wider operating range than possible with a conventional boost converter circuit. Note also that the switching of MOSFET transistor device 46 to enable electrical communication between second inductor 64 and diode 50 operates to invert and scale the voltage across capacitor 62 to the level of the input. As one can ascertain, the magnitude of this voltage may be controlled by both the duty cycle of the switches in bridge switching arrangement 60 and of reset switch 46.

Figure 6:
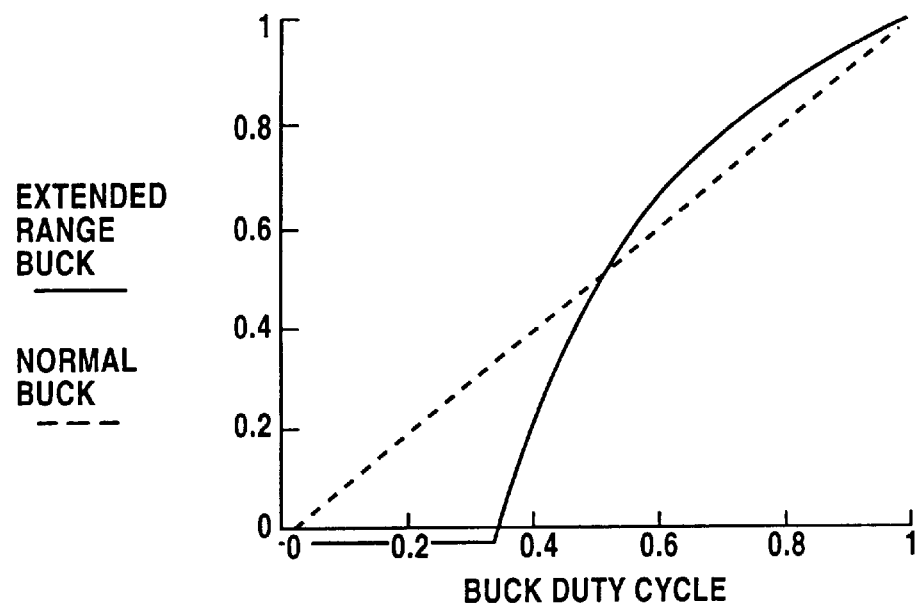
FIG. 6 is a graph illustrating the transfer function of the converter of the present invention when operated in buck mode of operation.
Figure 7:
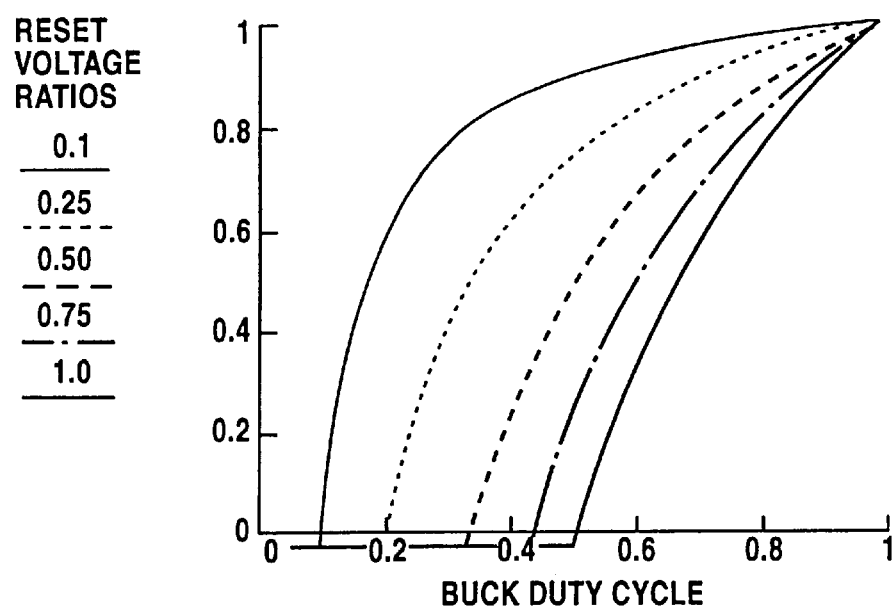
FIG. 7 is a graph showing the effect of varying reset voltage ratios on the transfer functions for different buck duty-cycles associated with the power converter according to the present invention.

The integral of the voltage across the inductor must be zero over a full cycle in steady state operation. Note that in order to maintain a zero integral of voltage on the inductor 42, this voltage must be at least $(Vin-Vo)*\alpha$ where $\alpha$ is the buck mode duty-cycle, defined as the time either switch pair (62,64 or 66, 68) is ON divided by the total ON-and-OFF time period T. As shown in FIG. 6, operation of the circuit in this mode produces a transfer function 90 different from that of a normal buck mode (reference numeral 92), while permitting the voltage to drop below the input for one ratio of voltage to the ratio of duty cycle on the buck reset switch. In this manner the voltage to which the inductor 42 can flyback can be controlled by the duty cycle of the reset switch device 46. This enables one to maintain an OFF state voltage on the switching arrangement switches that is substantially less than would be produced by resetting the inductor with an additional winding, as is commonly used. While the transfer function becomes more nonlinear, proper operation is still maintained and the voltage on the switching devices is reduced. FIG. 7 shows the effects on the transfer functions of varying the reset voltage ratio, i.e. the ratio of ON time to OFF time, for the reset switch circuit 54.

Another advantageous development of operating circuit 54 is realized when operating the converter 40 in normal boost mode. While operating circuit 54 is not essential for operation in boost mode, switching of switch device 46 at a duty cycle such that the combination of the reset voltage and input voltage is the same as the output voltage permits the circuit to recover certain energy loss. As is understood by one skilled in the art, a voltage spike on switching circuitry 60 may develop due to parasitic inductance or leakage inductance in the transformer or inductance in the output, when the current is zero. When operating in overlap boost mode (see FIG. 5A) such that only two of the four switches are on and current flows through inductor 42 through the operating switches to the transformer primary winding, any inductance in the transformer primary has zero current. Therefore, current ramp-up results in a voltage spike developing across the switches caused by parasitic or leakage inductance. If switch 46 is switched at a duty cycle such that the reset voltage plus the input voltage is substantially equal to the output voltage of the buck, then no current will flow in the reset operating circuit 54 since the load will absorb all of the current. Any energy reflected back to the output of the buck boost inductor 42 will attempt to increase this voltage over the output voltage. This increased voltage at terminal 42b causes the operating circuit 54 to conduct the energy back to the input. More particularly, the energy associated with the leakage inductance is applied to capacitor 62 via diode 44 and circulated back to the input through operation of switch 46 so that energy stored in the leakage inductance can be recovered. In this manner, the reset circuit acts to snub the voltage spike due to the leakage inductance. Therefore, the reset circuit, in addition to permitting operation where the output is less than the input (buck mode), may also be used as a loss recovery circuit during normal boost mode.

While one presently preferred topology has been described herein, other converter topologies such as half bridge and push-pull topologies, can be equally utilized as well. It is our intent therefore, to be limited only by the scope of the appended claims and not by the specific embodiments or details described herein.

What is claimed is:

1. A power converter comprising:
   a power transformer having a primary winding and a secondary winding of a given turns ratio;
   input means for receiving an input voltage;
   output means for providing an output voltage;
   an inductor coupled between the input means and the primary winding of said transformer;
   first and second power switching means coupled between said inductor and said transformer and operative in an on and off state according to a given duty cycle for controllably causing a flow of current from the primary winding;
   unidirectional conduction means coupled to the transformer secondary winding for rectifying flux-coupled energy to provide an output voltage Vo to the output means;
   means for controlling said duty cycle of said first and second power switching means to maintain the output voltage Vo at a preselected level; and
   means coupled to an output terminal of the inductor for providing a current path for discharging the inductor during a predetermined time interval according to the duty cycle of said power switching means.

2. The apparatus according to claim 1, wherein said inductor is a single winding inductor.

3. The apparatus according to claim 1, wherein said controlling means receives a feedback sample of said output voltage Vo for controlling the duty cycle of said switching means to selectively operate in a buck portion or a boost portion of an input-to-output transfer characteristic to regulate the output voltage at the pre-selected level.

4. The converter according to claim 1, wherein said discharge means comprises a capacitor serially coupled to a first unidirectional conduction device for storing energy associated with said inductor.

5. The converter according to claim 4, wherein said discharge means further comprises a switching device connected in parallel with said capacitor and connected to a second inductor and a second unidirectional conduction device to enable discharge of said capacitor through said second inductor when said switching device is enabled, and to enable discharge of said second inductor through said second unidirectional conduction device to said input means when said switching device is disabled.

6. The apparatus according to claim 5, wherein said switching device is operated at a second duty cycle corresponding to the duty cycle associated with said first and second switching means.

7. The apparatus according to claim 4, wherein said unidirectional current device is a diode having a first terminal coupled to an output terminal of said inductor and a second terminal coupled to a first terminal of said capacitor, and wherein said capacitor has a second terminal coupled to an input terminal of said inductor.

8. The apparatus according to claim 1, wherein said predetermined time interval corresponds to a buck portion of the duty cycle wherein said first and second switching means are non-conducting.

9. The converter according to claim 1, wherein said first and second switching means are semiconductor switching devices.

10. A power converter comprising:

a power transformer having a primary winding and a secondary winding flux coupled to the primary winding;

input means for receiving an input voltage;

output means for providing an output voltage;

a single winding inductor coupled between the input means and the primary winding;

a switching arrangement comprising a plurality of switches which are switched on and off according to a duty cycle for controllably causing a flow of current from the primary winding;

means for controlling the duty cycle of said switching arrangement;

unidirectional conduction means coupled to the transformer secondary winding for rectifying flux coupled energy to provide an output voltage Vo to the output means; and means coupled to an output terminal of the inductor for providing a current path for discharging the inductor during a predetermined time interval associated with a portion of the duty cycle of the switching arrangement when said plurality of switches are off to enable the power converter to operate in a mode where the output voltage Vo is lower than the input voltage.

11. The converter according to claim 10, wherein said discharge means comprises:

a first unidirectional conduction device having a first end coupled to an output terminal of the inductor;

a capacitor having a first terminal coupled to a second end of the first unidirectional conduction device, and a second terminal coupled to an input terminal of the inductor; and a switching circuit connected in parallel with said capacitor and selectively enabled during the predetermined time interval associated with the portion of the duty cycle of the switching arrangement when said plurality of switches are off to enable discharge of energy stored in the capacitor.

12. The converter according to claim 11, wherein the switching circuit comprises a controllable switch coupled to a second inductor and to a second unidirectional conduction device such that enabling the switch enables a communication path between the second inductor and the capacitor to discharge the capacitor, and disabling the switch enables a communication path between the second inductor and the second unidirectional conduction device for energy discharge to the input means.

13. The converter according to claim 10, wherein the plurality of switches of the switching arrangement are arranged in a bridge configuration.

14. A buck-boost converter comprising:

a power transformer having a primary winding and a secondary winding of a given turns ratio;

input terminals for receiving an input voltage;

output terminals for providing an output voltage;

a single winding inductor coupled between the input terminals and the primary winding;

a switching arrangement comprising a plurality of switches to be turned on and off according to a duty cycle for controllably causing a flow of current through the primary winding;

a controller for controlling the duty cycle of said switching arrangement;

unidirectional conduction means coupled to the transformer secondary winding for rectifying flux coupled energy to provide an output voltage Vo to the output means;

means coupled to an output terminal of the inductor and operable in a first mode for providing a path for discharging the inductor during a predetermined time interval associated with a portion of the duty cycle of the switching arrangement when said plurality of switches are each off to enable the boost converter to operate in a first mode where the voltage Vo is lower than the input voltage, and operable in a second mode for providing a path for discharging energy associated with leakage inductance reflected to the output terminal of said single winding inductor when the boost converter is operated in a second mode wherein said plurality of switches are each on during a same portion of said duty cycle.

15. The converter according to claim 14, wherein said controller means is responsive to said output voltage to adjust the duty cycle of said switching arrangement to enable operation in said first or second modes.

16. The converter according to claim 15, wherein said means coupled to the output terminal of said inductor comprises a reset circuit including a switch to be turned on and off according to a second duty cycle to selectively discharge energy through said path of said reset circuit.

17. The converter according to claim 16, wherein said controller means operates to control said second duty cycle at a rate proportional to said duty cycle of said switching arrangement.

18. In a boost converter comprising a power transformer having a primary winding and a secondary winding flux-coupled to the primary winding, input terminals for receiving an input voltage; output terminals for providing an output voltage; a switching arrangement coupled to said transformer comprising a plurality of switches to be turned on and off according to a duty cycle for controllably causing a flow of current through the primary winding of said transformer such that the output voltage is greater than the input voltage; means for controlling the duty cycle of said switching arrangement; unidirectional conduction means coupled to the transformer secondary winding for rectifying flux coupled energy to provide the output voltage Vo to the output means, the improvement comprising:

a single winding inductor coupled between the input means and the primary winding; and an operating circuit coupled to an output terminal of the inductor for providing a path for discharging energy associated with leakage inductance reflected to the output terminal of the inductor through the switch arrangement back to the input means, whereby the energy is recovered and recycled through the boost converter.

19. The converter according to claim 18, wherein the operating circuit includes a capacitor for storing and discharging energy associated with said leakage inductance; and a switch responsive to a signal from said control means for enabling said capacitor to discharge according to a given duty cycle.

20. The converter according to claim 18, wherein said operating circuit further includes:

a first diode having a first end coupled to an output terminal of said inductor and a second end coupled to a first terminal of said capacitor, said capacitor having a second terminal coupled to an input terminal of said inductor; and a second inductor having a first end coupled to said inductor first terminal and a second end coupled to said switch and to a second diode.

\* \* \* \* \*